March 29, 1955    H. R. SODERSTROM    2,705,083
SELF LOADING CARGO ELEVATING TRUCK
Filed Jan. 14, 1952    4 Sheets-Sheet 1
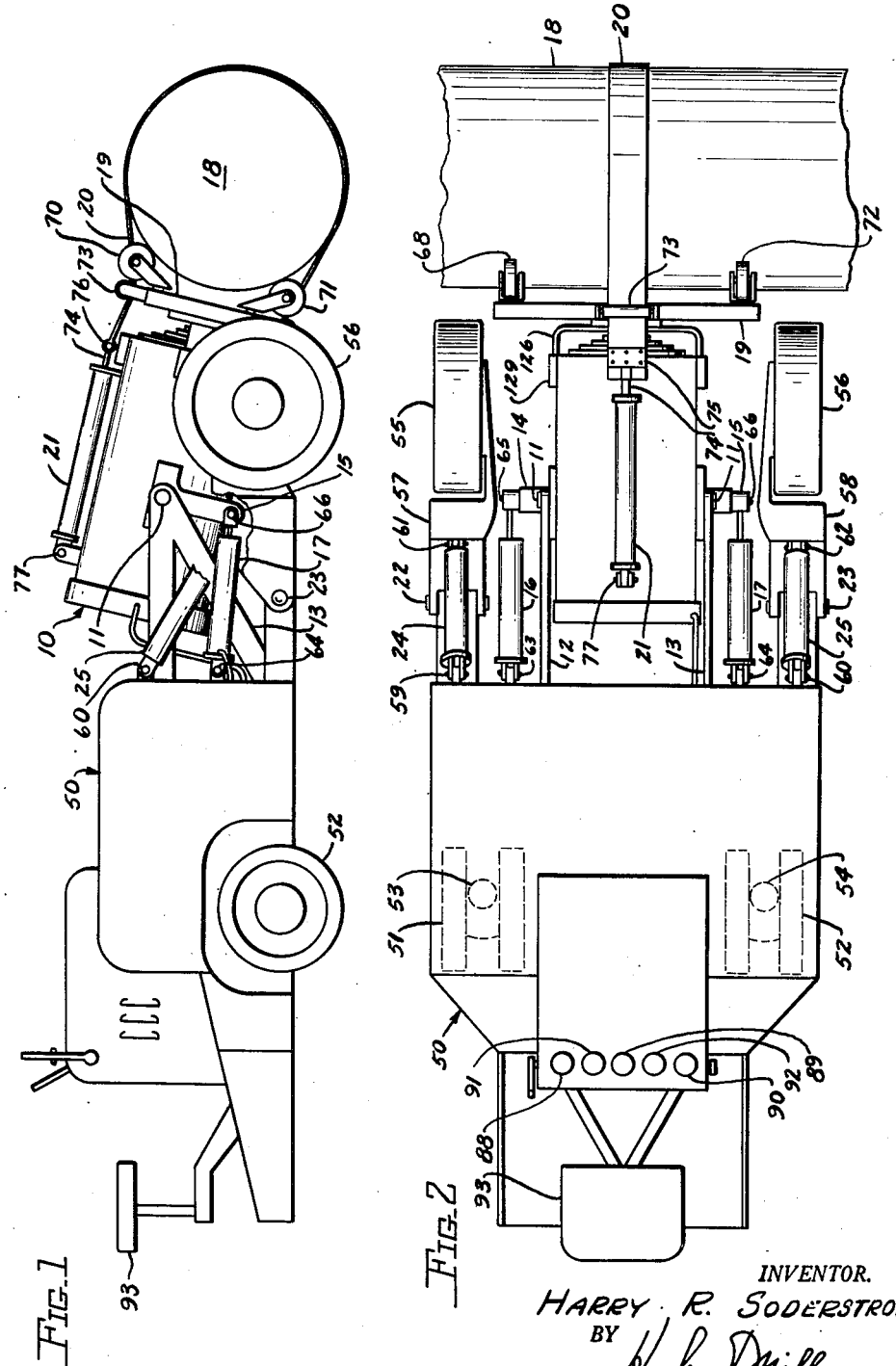
INVENTOR.
HARRY R. SODERSTROM
BY Hubert D Miller March 29, 1955 H. R. SODERSTROM 2,705,083
SELF LOADING CARGO ELEVATING TRUCK
Filed Jan. 14, 1952 4 Sheets-Sheet 2
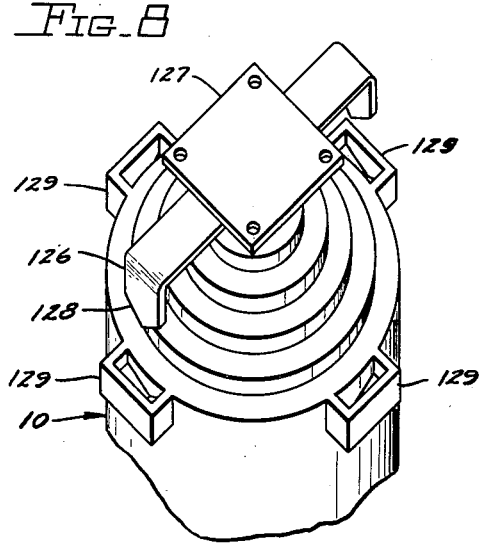
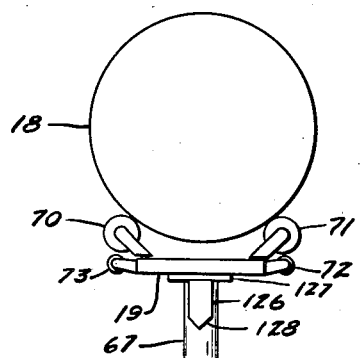
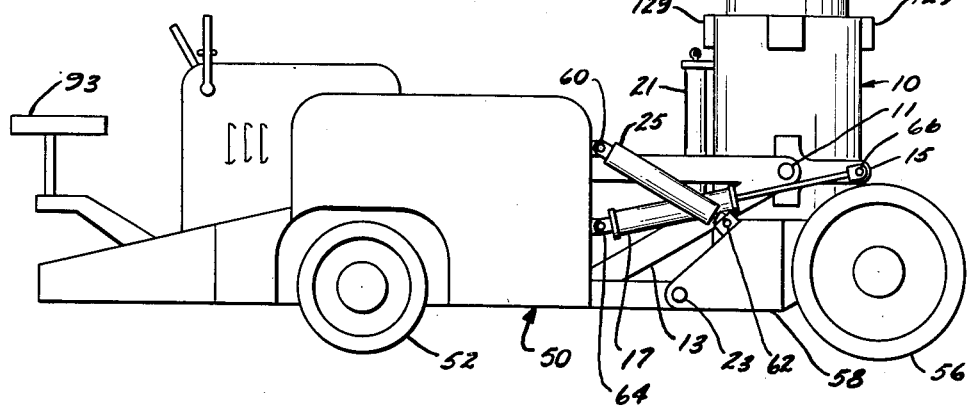
INVENTOR.
HARRY R. SODERSTROM
BY Hubert Miller March 29, 1955     H. R. SODERSTROM     2,705,083
SELF LOADING CARGO ELEVATING TRUCK
Filed Jan. 14, 1952     4 Sheets-Sheet 3
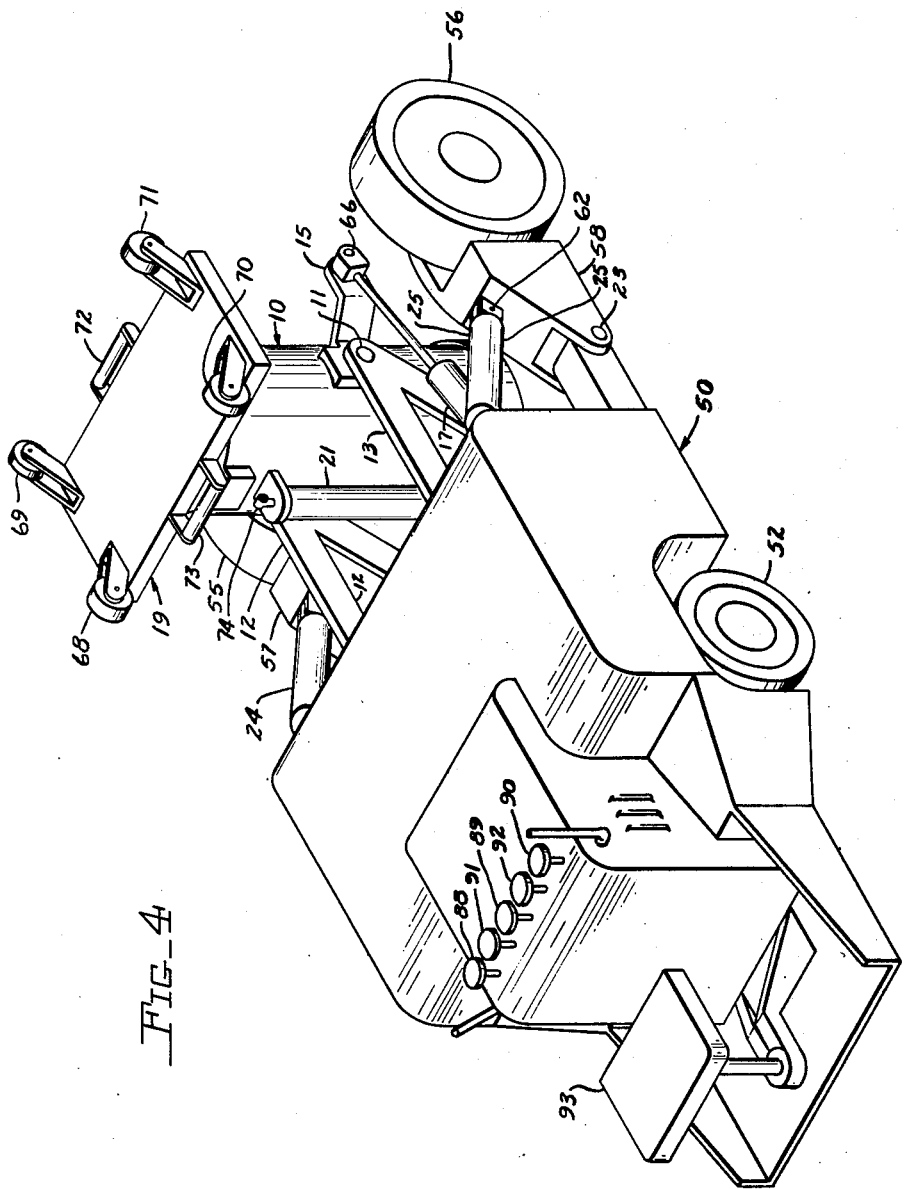
FIG_4
INVENTOR.
HARRY R. SODERSTROM
BY Hubert Miller March 29, 1955  H. R. SODERSTROM  2,705,083
SELF LOADING CARGO ELEVATING TRUCK
Filed Jan. 14, 1952  4 Sheets-Sheet 4

INVENTOR.
HARRY R. SODERSTROM
BY
Hubert Miller

United States Patent Office 2,705,083
Patented Mar. 29, 1955

2,705,083

SELF-LOADING CARGO ELEVATING TRUCK

Harry R. Soderstrom, Wichita, Kans., assignor to Boeing Airplane Company, Wichita, Kans., a corporation of Delaware Application January 14, 1952, Serial No. 266,316

4 Claims. (Cl. 214—650)

This invention relates to power operated freight handling vehicles.

It is the primary object of the invention to provide a self-propelled, self-contained, self-loading cargo transporting and elevating vehicle capable of picking up a heavy load at ground level, lifting the load to a position for transport to a desired point, and elevating the load to a desired unloading height. The invention is particularly adapted for use in stacking freight in warehouses, marine vessels and railway cars, and for elevating freight into the cargo compartments and bomb bays of aircraft.

Another object is to provide a vehicle of this type which elevates its load in such a manner that no part of the lifting apparatus is above or projecting laterally beyond the outline of the cargo during the lifting process, thus making it possible to lift the load through an opening barely large enough to receive it, and to position the load against the ceiling or top of the compartment, if necessary.

It is a further object to provide a vehicle of the type mentioned which permits the position of the load to be changed by partial or complete rotation in a horizontal plane either during elevation of the load, or after the load has been elevated to the desired height; and which is also capable of moving the load fore or aft along the longitudinal center line of the machine, either during or after complete elevation of the load.

Another object is to provide a freight handling vehicle or truck which is comparatively low in overall height when collapsed or retracted, and will therefore pass under a relatively low obstruction even when loaded, yet which is capable of elevating the load a vertical distance several times its normal retracted height by means of telescoping fluid pressure operated cylinders.

Another object is to provide a freight handling truck the loading and elevating mechanism of which is fluid pressure operated, but which is self-contained to the extent that it needs no extraneous source of fluid pressure.

Still another object is to provide a cargo handling vehicle which includes double acting pressure actuated telescoping cylinders for elevating a load vertically to a desired height, and also for moving a load along the vehicle supporting surface toward the vehicle chassis, if necessary.

Generally speaking, the invention includes a low, wheeled, engine propelled chassis, a nest of telescoping hydraulic cylinders tiltable fore and aft in a vertical plane on a transverse horizontal axis located near one end of the chassis, a load supporting platform fixed on the free end of the innermost telescoping cylinder, an independent hydraulic cylinder for tilting the nest of telescoping cylinders about its axis, a means for securing a load to the platform when it is near a ground engaging position, an engine driven pump, a hydraulic fluid reservoir, and a fluid pressure accumulator for actuating the various hydraulic cylinders, and control means for all of said cylinders.

The invention, together with other objects attending its production, will be more clearly understood when the following description is read in connection with the accompanying drawings, in which:

Fig. 1 is a side elevation of a cargo handling vehicle embodying my invention, the vehicle being shown in the act of picking up a load from the vehicle supporting surface;

Fig. 2 is a plan view of the same;

Fig. 3 is a side elevation similar to Fig. 1, but shows the load in an elevated position;

Fig. 4 is a perspective view of the same vehicle with the telescoping load lift cylinder retracted and in vertical lifting position;

Fig. 8 is a fragmentary perspective view of the main lift cylinder showing further details of construction.

Figure 7:
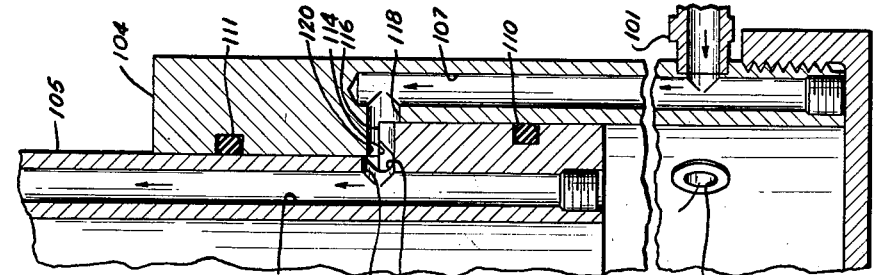
Figs. 6 and 7 are fragmentary vertical sectional views showing details of construction of the load lift cylinder.

Referring to the drawings, the numeral 50 indicates a vehicle chassis as a whole. The chassis includes two pairs of rear dual wheels 51—52, mounted on independent vertical turning axes 53—54, and interconnected by means not shown for coordinated steering. The front wheels 55—56 are independently mounted on rigid fore and aft disposed arms 57—58, the aft ends of which are pivotally connected to the main frame of the chassis at laterally spaced points on horizontal lateral axes 22—23, respectively. Working cylinders 24 and 25 each have one end pivotally connected to the chassis at 59—60, and the free ends of their plungers pivotally connected to arms 57 and 58 at 61—62.

Considering the relative locations of pivot points 22—23, 59—60, and 61—62, it can easily be seen that points 22—23 and consequently the forward end of the chassis, will be lowered when cylinders 24—25 are elongated, and raised when these cylinders are contracted or shortened. This makes it possible to provide adequate ground clearance to permit the vehicle to travel over rough terrain when being used as a bomb hoist, for instance, yet makes it possible to lower the overall height of the loader when such becomes necessary to clear the underside of an airplane fuselage while maneuvering the loader into proper position to lift a bomb into the bomb bay of the airplane. This feature is not essential but is highly advantageous when the loader is to be used as a bomb lift.

The chassis includes a laterally spaced pair of rigid forwardly projecting arms 12 and 13. A nest 10 of telescoped hydraulic working cylinders is pivotally suspended between the forward ends of these two arms by means of aligned transverse horizontal pivots 11—11. Forwardly projecting rigid arms 14 and 15 are rigidly secured to the outer cylinder of the nest 10 in identically oriented positions with relation to the longitudinal axis of the nest, and substantially at right angles thereto. Hydraulic working cylinders 16 and 17 each have one end pivotally connected to the chassis at 63—64 respectively, and the ends of their plungers pivotally connected to the forward ends of arms 14 and 15, at pivot points 65 and 66, respectively.

It can thus be seen that when working cylinders 16 and 17 are simultaneously extended, the cylinder nest 10 will be pivoted into a vertical position, as shown in Fig. 3, and that by retracting or shortening those cylinders the nest can be tilted forward so that its working end approaches a load 18 on the ground, as shown in Figs. 1 and 2.

The innermost cylinder 67 of the nest 10 rigidly carries a load platform 19. While various different types of load platforms may be used, depending on the type of load to be handled, the platform shown is primarily for the handling of substantially cylindrical objects, such as bombs. To this end the platform is provided with four removable upstanding rollers 68, 69, 70, and 71 (Fig. 4).

As one means of holding a load firmly in position on the platform 19, a wide strap 20 has one end connected centrally to one side edge of the platform at 72 (Fig. 1). In a similar position at the opposite edge of the platform is an idler roller 73, spaced from the platform edge by brackets so that strap 20 can be threaded through the space between the roller and platform after the strap has been placed around the bomb 18. The normally free end of strap 20 is fitted with suitable means for removably securing it to the free end of the plunger 74 of a hydraulic working cylinder 21. In the embodiment shown, the strap attaching means is a metal bracket 75 the free end of which is bifurcated to receive the plunger end. A pin 76 passes laterally through the plunger end and through the furcations of the bracket to complete the connection. The base end of cylinder 21 is pivotally connected to the side of the outermost cylinder of the nest 10 at 77. By means of this cylinder and strap, then, the load 18 can be held firmly against the platform rollers, the cylinder nest 10 can be moved to a vertical position, and by extending the telescoped nest of cylinders 10, the load 18 can be elevated to the desired position, within the limits of extension of the cylinders 10.

*Hydraulic system and controls*

Figure 5:
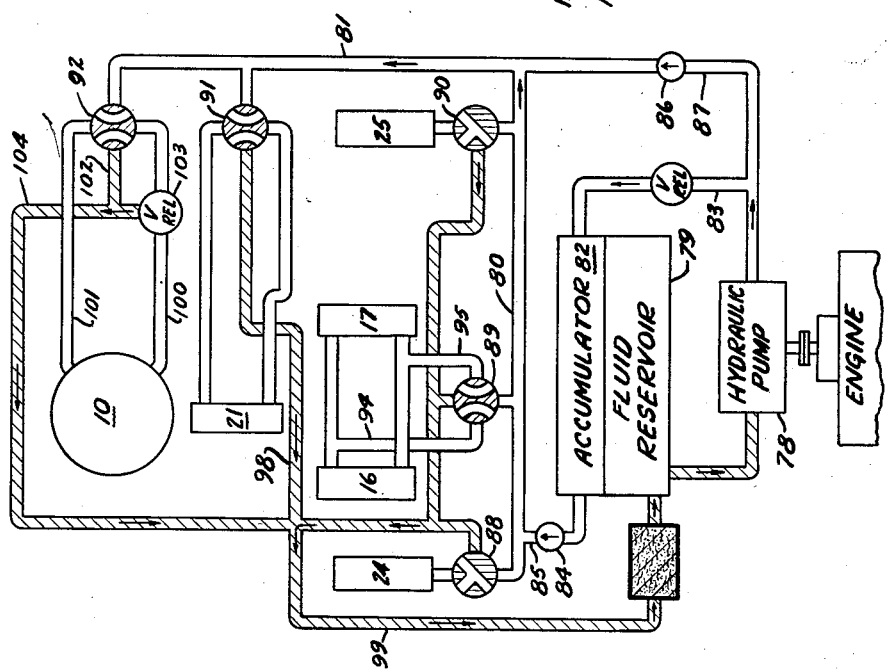
Fig. 5 is a schematic diagram of the hydraulic pressure system which constitutes a part of the vehicle shown.

Fig. 5 is a diagrammatic view of the entire hydraulic system and shows the various cylinders in their approximate relative positions on the above described vehicle. All exhaust lines have been cross hatched to clearly distinguish them from the pressure lines.

Hydraulic pump 78 is driven by an engine power take-off unit. The pump intake is connected to a fluid reservoir 79, and the pump discharges into header lines 80 and 81, and is also connected to a pressure accumulator 82 by line 83. The accumulator communicates with headers 80 and 81 through a check valve 84 in line 85. A check valve 86 in pressure line 87 prevents fluid from being forced through that line when the pump is not operating.

Valves 88 to 92 inclusive are all mounted on the vehicle to be easily accessible to an operator sitting in seat 93. These valves, as well as most pressure and return lines have been omitted from the other drawing figures for clarity.

Valves 88 and 90 are conventional 3-way valves which independently control the operation of the front end elevating cylinders 24 and 25, respectively. These cylinders need not be double acting because the weight of the vehicle serves to retract or shorten them.

Valve 89 is a conventional 4-way valve capable of connecting header 80 with line 94 to simultaneously retract cylinders 16 and 17, while simultaneously connecting line 95 with exhaust or fluid return line 96. This valve is also capable of connecting header 80 with line 95 while simultaneously connecting line 94 with return line 96. Thus the plungers of cylinders 16 and 17 can be forced to move inward or outward, and cylinder nest 10 can be tilted, as desired, between vertical and substantially horizontal positions.

Valve 91 is an identical 4-way valve and controls the flow of pressure fluid to and from the opposite ends of cylinder 21, the header 81 supplying the pressure fluid, and return line 98 carrying off the exhausted fluid to main fluid return line 99.

Valve 92 is an identical 4-way valve which controls the flow of pressure fluid to and from the nest of lifting cylinders 10, through pressure lines 100 and 101, and through return line 102. Relief valve 103 prevents full line pressure from being applied to the interior of cylinder nest 10 during load lifting action, excess pressure being discharged into return line 104.

*Double acting telescoping cylinders*

Figure 6:
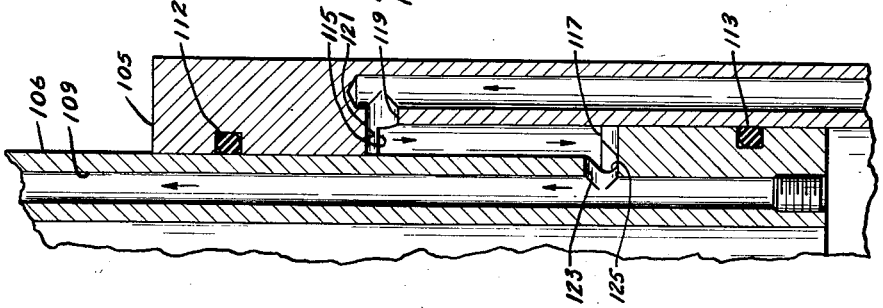

The construction which makes cylinder nest 10 double acting is illustrated in Figs. 6 and 7, which are vertical sectional views through the walls of three adjacent cylinders of the nest. Numeral 104 designates the outermost cylinder of the nest, numeral 105 the next adjacent inner cylinder, and numeral 106 the next adjacent inner cylinder. These cylinders have longitudinally disposed ducts 107, 108, and 109 in their respective walls, the duct 107 communicating at its lower end with pressure fluid line 101. Annular O-ring seals 110, 111, 112, and 113 prevent escape of pressure fluid from the spaces between the sliding surfaces of the cylinders.

At its upper end each cylinder is provided with an internal annular shoulder, indicated at 114 and 115. The cylinders are also provided at their lower ends with cooperating external annular shoulders 116 and 117. The overlapping contact of these shoulders serves to limit the outward movement of each cylinder with respect to the next adjacent outer cylinder, as clearly shown in Fig. 7.

To afford fluid communication between the respective longitudinal ducts 107, 108, 109, etc., regardless of the orientation of the cylinders with respect to each other, the upper end of each cylinder is provided with a lateral port drilled outward from the inner wall surface to communicate with the respective longitudinal ducts. A portion of these ports 118 and 119 cut into the surfaces of shoulders 114 and 115 respectively, these undercuts affording small fluid passages 120 and 121 even when the cooperating shoulders are in contact, as in Fig. 7.

Additionally the lower ends of the respective cylinders are provided with lateral ports 122 and 123 which are also undercut partially into the respective shoulders 116 and 117. Adjacent to the shoulders 116 and 117, and located at the angle between those shoulders and the respective exterior walls of the cylinders, these cylinders are provided with annular grooves 124 and 125, with which ports 122 and 123 communicate respectively. It will be seen from Fig. 7 that a portion of the annular groove 124 underlies an annular portion of shoulder 114 when that shoulder is seated on shoulder 116.

Thus when the cooperating stop shoulders on each adjacent pair of cylinders are in contact and the entire cylinder nest is extended to its maximum length, pressure fluid may flow from supply line 101 through duct 107, through undercut passage 120, through annular groove 124, and into duct 108 through port 122, regardless of whether or not ports 122 and 118 are in register. Pressure is thus exerted on opposing identical areas of shoulders 114 and 116, and the cylinders are forcibly retracted. Fig. 6 shows cylinder 106 being forced downward into a retracted position within cylinder 105. The same action, of course, occurs simultaneously between each adjacent pair of cylinders. This forcible retraction makes it possible for the operator to extend the cylinders when the nest is in a horizontal position, attach a load to the platform, and then pull the load along the vehicle supporting surface by retracting all cylinders. This makes it possible to handle freight, etc., through a narrow opening—one which will not admit the entire vehicle but is large enough to admit the load platform 19.

The telescoping cylinders are extended by simply turning valve 92 and allowing pressure fluid to enter the entire nest through pressure supply line 100. With the arrangement above described, it will be seen that a double acting nest of telescoping cylinders has been provided.

As mentioned above, each cylinder in the nest 10 except the outermost one 104 is rotatable about its own longitudinal axis either during extension or retraction, or after all cylinders have been completely extended. This makes it possible to rotate platform 19 and its load to properly position the load for entrance into a restricted door or other opening.

However, when the cylinders are nested and tilted forward to receive a load, as in Fig. 1, it is best to prevent rotation of platform 19, at least until the nest has been returned to vertical position and the lifting operation has begun. To this end a substantially U-shaped rigid cross arm 126 is rigidly secured in an inverted position to the upper end of the innermost cylinder in the nest 10, beneath the platform attaching plate 127, as clearly shown in Fig. 8. The downwardly pointing ends of this arm are tapered to a point, as indicated at 128. This arm is disposed in a position parallel to the longitudinal or lateral centerline of plate 127, and centrally with relation to the longitudinal axis of cylinder nest 10. Four identical lugs 129 are secured, as by welding, to the upper end of cylinder 104, in 90° spaced relation. The upper end of each lug is provided with a seat for receiving one of the tapered ends of arm 126. Thus either opposite pair of lugs 129 is capable of seating the opposite ends of arm 126 when the cylinders are retracted, and cooperate to prevent rotation of the innermost cylinder and its platform so long as the cylinders remain retracted.

*Operation*

The vehicle may be driven by the operator to a loading point, with the nest of lift cylinders preferably in a vertical position, as in Fig. 4. Tilt cylinders 16 and 17 are then actuated by means of control valve 89 so that the lift cylinders tilt forward to the position shown in Fig. 1. The vehicle may then be driven forward until platform 19 is adjacent the box or other load to be handled. Strap 20 is placed centrally around the load 18 and tightened by means of cylinder 21, drawing the load into firm contact with the platform. Cylinder nest 10 is then moved to a vertical position by cylinders 16 and 17, and the vehicle may be driven to a load discharge point. If it is desired to lower the pivot axis 11 of cylinder nest 10 during the loading operation so that the cylinder nest may more nearly approach a true horizontal position, it is only necessary to shorten cylinders 24 and 25 by means of valves 88 and 90, and the entire front end of the vehicle is lowered. By lengthening these cylinders desired road clearance may be maintained.

When the vehicle has been maneuvered to place the load on platform 19 in proper position for unloading, cylinder 21 is elongated and strap 20 is removed from around the load. Valve 92 may then be turned clockwise 45° (Fig 5) and the telescoping cylinders will lift the load on platform 19 to the desired elevation.

Having pointed out the objects and advantages of this invention, and having described the construction and operation of one embodiment of it with sufficient clarity to enable those familiar with this art to construct and use it, I claim:

1. A cargo handling vehicle comprising: a main frame; a nest of fluid pressure actuated telescoping lift cylinders the outer one of which is pivotally mounted intermediate its ends on said frame to tilt in a plane substantially normal to the vehicle supporting surface; cooperating duct means incorporated in said nest of cylinders for applying fluid pressure thereto in a direction to positively move them to nested positions; a cargo platform carried by the outer end of the innermost lift cylinder; a tilt cylinder and coacting plunger, the closed end of said tilt cylinder being pivotally connected to the frame, and the outer end of the tilt cylinder plunger being operably connected with the outermost lift cylinder at a point spaced from its pivot axis, whereby when said tilt cylinder plunger is moved inward and outward the entire nest of lift cylinders is tilted in opposite directions about its pivot axis and said platform is moved toward and away from the vehicle supporting surface; a source of fluid pressure connected to all of said cylinders; and means for selectively controlling the actuation of said lift cylinders in both directions, and of said tilt cylinder independently.

2. A cargo handling vehicle comprising: a main frame; a lift cylinder and coacting plunger pivotally mounted on said frame to swing in a plane substantially normal to the vehicle supporting surface; a cargo platform affixed to the outer end of said plunger; a tilt cylinder and coacting plunger, the closed end of said tilt cylinder being pivotally secured to the frame, and the outer end of the tilt cylinder plunger being operatively connected with said lift cylinder at a point spaced from its pivot axis, whereby when said tilt cylinder plunger is moved inward and outward the lift cylinder is tilted in opposite directions about its pivot axis and moves said platform toward and away from the vehicle supporting surface; a working cylinder and a coacting plunger mounted longitudinally along the wall of said lift cylinder with the free end of the working cylinder plunger adjacent one edge of said platform; a load encircling flexible element having one end secured to the opposite edge of said platform; means for releasably connecting the opposite end of the flexible element to the free end of the plunger of said working cylinder, whereby the flexible element may be tightened by said cylinder about a load on said platform; a source of fluid pressure connected to all said cylinders; and means for selectively controlling the operation of the lift cylinder, the tilt cylinder, and the working cylinder independent of each other.

3. A cargo handling vehicle comprising: a main frame; an elongatable load moving member including a telescoping nest of fluid pressure actuated cylinders, the outermost one of which is pivotally supported on said frame to tilt in a vertical plane; controllable means capable of applying fluid under pressure to said nest in a direction to extend said cylinders to positively elongate the load moving member; controllable means capable of applying fluid under pressure to said nest in a direction to retract said cylinders to a nested position to positively shorten the load moving member; a cargo platform carried on the outer end of the innermost cylinder in said nest; a double acting working cylinder having its closed end pivotally connected to the frame, and the outer end of its plunger pivotally connected with the outermost one of the nested cylinders at a point spaced from the pivot axis of said outermost cylinder, whereby when said working cylinder plunger is moved inward and outward the entire nest of cylinders is tilted in opposite directions; and independent means for controlling the actuation of said working cylinder.

4. A cargo handling vehicle comprising: a main frame; an elongatable load moving member including a telescoping nest of fluid pressure actuated cylinders, the outermost one of which is pivotally supported on said frame to tilt in a vertical plane; controllable means capable of applying fluid under pressure to said nest in a direction to extend said cylinders to positively elongate the load moving member; controllable means capable of applying fluid under pressure to said nest in a direction to retract said cylinders to a nested position to positively shorten the load moving member; a cargo platform carried on the outer end of the innermost cylinder in said nest; a double acting working cylinder having its closed end pivotally connected to the frame, and the outer end of its plunger pivotally connected with the outermost one of the nested cylinders at a point spaced from the pivot axis of said outermost cylinder, whereby when said working cylinder plunger is moved inward and outward the entire nest of cylinders is tilted in opposite directions; fluid pressure actuated means associated with said platform for securing a cargo load thereon; and independent means for controlling the actuation of the load securing means.

References Cited in the file of this patent

UNITED STATES PATENTS

| | | |
|---|---|---|
| 1,377,978 | Weber | May 10, 1921 |
| 1,733,988 | Barnard | Oct. 29, 1929 |
| 1,816,736 | Miller | July 28, 1931 |
| 1,835,132 | Anania | Dec. 8, 1931 |
| 1,918,426 | Radnor | July 18, 1933 |
| 1,947,264 | Johnson et al. | Feb. 13, 1934 |
| 2,433,900 | Grime | Jan. 6, 1948 |
| 2,596,462 | Ball | May 13, 1952 |
| 2,603,373 | McFarland et al. | July 15, 1952 |
| 2,606,078 | Brock | Aug. 5, 1952 |
| 2,624,476 | Schmidt | Jan. 6, 1953 |

FOREIGN PATENTS

| | | |
|---|---|---|
| 101,792 | Sweden | June 10, 1941 |

OTHER REFERENCES

Serial No. 340,618, Magni et al. (A. P. C.), published May 4, 1943.